（12）United States Patent
Agarwal et al.

(10) Patent No.: US 9,311,438 B1
(45) Date of Patent: Apr. 12, 2016

(54) SIGNAL DELAY FLIP-FLOP CELL FOR FIXING HOLD TIME VIOLATION

(71) Applicants: Amol Agarwal, New Delhi (IN); Gaurav Goyal, Greater Noida (IN); Abhishek Mahajan, Chandigarh (IN); Sidhartha Taneja, New Delhi (IN)

(72) Inventors: Amol Agarwal, New Delhi (IN); Gaurav Goyal, Greater Noida (IN); Abhishek Mahajan, Chandigarh (IN); Sidhartha Taneja, New Delhi (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/509,037

(22) Filed: Oct. 7, 2014

(51) Int. Cl.
*G06F 17/50* (2006.01)
*H03K 3/037* (2006.01)
*H03K 3/012* (2006.01)

(52) U.S. Cl.
CPC ............ *G06F 17/5031* (2013.01); *H03K 3/012* (2013.01); *H03K 3/0375* (2013.01); *G06F 2217/02* (2013.01); *G06F 2217/84* (2013.01)

(58) Field of Classification Search
CPC ..... H03K 3/012; H03K 3/0372; H03K 23/68; H03K 17/16; H03K 17/22; G06F 17/10; G06F 1/26; G06F 1/32; G06F 1/10; G06F 1/08
USPC ........................... 327/108, 199, 200, 202, 215
See application file for complete search history.

(56) References Cited

U.S. PATENT DOCUMENTS

| 6,614,276 | B2 | 9/2003 | Robertson |
| 6,895,540 | B2 | 5/2005 | Chen |
| 7,649,395 | B2 | 1/2010 | Ahmadi |
| 7,843,218 | B1 | 11/2010 | Ramaraju |
| 8,222,921 | B2 | 7/2012 | Lewis |
| 8,316,340 | B2 | 11/2012 | Chen |
| 8,493,119 | B2 | 7/2013 | Leach |
| 2004/0190331 | A1* | 9/2004 | Ross ................. G11C 29/1201 365/154 |

OTHER PUBLICATIONS

Rubil Ahmadi, "A Hold Friendly Flip-Flop for Area Recovery", IEEE No. 04253501, 2007.
Rubil Ahmadi, "A Power Efficient Hold-Friendly Flip-Flop", 2007, IEEE No. 04606326, 2007.

* cited by examiner

*Primary Examiner* — John Poos
(74) *Attorney, Agent, or Firm* — Charles E. Bergere

(57) ABSTRACT

A signal delay cell for use in resolving hold time violations in an IC has a first multiplexer having a first functional data input node and a scan data input node TI and a second multiplexer having a second functional data input node, a second input node connected to the output of the first multiplexer and a flip-flop module. The propagation of a data input signal applied to the first multiplexer is delayed, and the hold margin of the flip-flop module is increased by transit through the first multiplexer. The signal delay cell is available to replace a flip-flop having a scan data hold problem, and also for use in solving a functional data violation in the same or another cell.

12 Claims, 6 Drawing Sheets

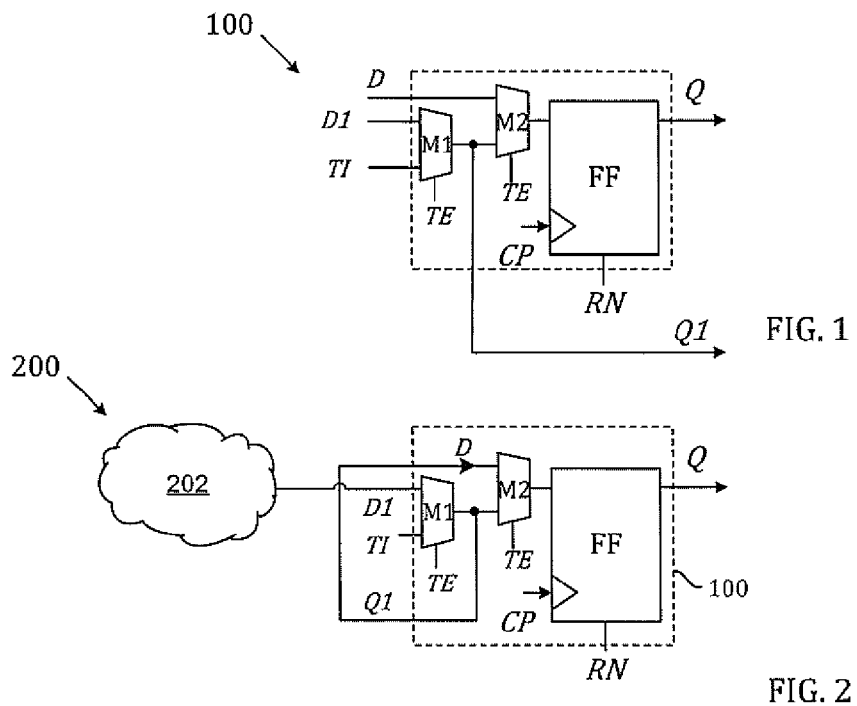

US 9,311,438 B1

SIGNAL DELAY FLIP-FLOP CELL FOR FIXING HOLD TIME VIOLATION

BACKGROUND OF THE INVENTION

The present invention is directed to an integrated circuits (IC) and, more particularly, to a signal delay flip-flop cell for fixing a hold time violation.

In electronic circuits and data processing systems, clocked flip-flops are commonly used for propagating data through various data paths. Such flip-flops typically include master and slave latches using clock signals for receiving data inputs and propagating data within the IC in functional mode. Testability typically requires the flip-flops to be connectable, in scan test mode, into a serial scan chain for loading and unloading scan test signals (vectors).

Proper operation during either functional or test modes requires that the input data be captured before the data has changed again, before the set-up time of the flip-flop, and that the output of the flip-flop remain stable for a sufficient hold time for the next element in the IC to capture the data before the next clock phase. In modern systems, hold violations are most pervasive in data paths that have minimal logic between successive flip-flops. Serial scan chains are particularly susceptible to hold violations because there is little or no logic between the successive flip-flops.

ICs are designed using electronic design automation (EDA) tools. During the design flow, register-transfer-level (RTL) abstraction typically is used to create high-level representations of the IC, selecting standard cell designs and their characteristics from a standard cell library. The RTL description is typically converted to a gate-level description (such as a net-list) that can then be used by placement tools to create a physical layout. Placement is followed by clock tree synthesis (CTS) where distribution of clock signals is organized and problems of clock skew resolved.

Set-up time violations can often still be resolved even post-CTS. However, typically, hold time violations are a challenge, due to poor visibility of potential hold problems pre-CTS, while clock skew is not yet taken into account, and due to the design resources required to solve problems post-CTS. Conventionally, buffers have been added to slow data signals for problematic flip-flops, but at a penalty in terms of power consumption, chip area, and routing resources. The design problem arises only at the design stage of a product but the penalties are incurred throughout the life of the product.

It would be advantageous to have a way of resolving hold time problems efficiently, flexibly and with little or no penalty in terms of power consumption, chip area, and routing resources.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

FIG. 1 is a schematic block diagram of a signal delay cell in an integrated circuit in accordance with an embodiment of the invention;

FIGS. 2 to 4 are schematic block diagrams of integrated circuits in accordance with different embodiments of the invention;

DETAILED DESCRIPTION OF THE INVENTION

FIGS. 1 to 4 illustrate integrated circuits (ICs) 200, 300 and 400 in accordance with embodiments of the invention. The ICs 200, 300 and 400 include logic cells 202, 302 and 402 to 406 and flip-flop cells 100, 304, 306 and 408, 410. The flip-flop cells FF, and FF1 to FF5 are connected with the logic cells 202, 302 and 402 to 406 in a combination in a functional mode of operation, and are connected together in series in a scan test mode of operation by a scan control signal TE for shifting scan test data into the IC.

At least one of the flip-flop cells provides a signal delay cell 100, 408, 410 that has a first multiplexer M1 having a first data input node D1, a scan data input node TI and a first output node Q1, a second multiplexer M2 having a second data input node D, a second input node connected to the first output node Q1, and a second output node, and a flip-flop module FF, FF1, FF4, FF5 having a data input connected to the second output node, a clock input node CP, CP1 and a flip-flop output node Q. The propagation of a scan data input signal TI applied to the scan data input node in the scan test mode of operation is delayed, and the hold margin of the flip-flop module FF, FF1, FF4, FF5 for the scan data input signal is increased, by transit through the first multiplexer M1.

If buffers were used to resolve hold time violations, the IC would have penalties in terms of power consumption, chip area, and routing resources. The design problem of hold time violations can often be resolved in accordance with embodiments of the invention, by including one, or a bank of the signal delay flip-flop cells 100, 408, 410 in the layout that are then available for substitution for a problematic flip-flop, or for including in signal input paths to a problematic flip-flop to improve the hold time criteria.

As illustrated in FIG. 2, the first data input node D1 may be connected with the combination of cells 202 to receive functional data input signals D1 in the functional mode of operation. The signal delay cell 100 has the second data input node D connected to the first output node Q1 to receive functional data signals Q1 from the combination of logic cells 202 whose propagation is delayed, and for which the hold margin of the signal delay cell 100 is increased, by transit through the first multiplexer. This configuration enables resolution of hold time violations in both the functional data signal D1 from 202 and the scan data signal TI in the same cell by replacing the problematic flip-flop cell by the signal delay cell 100.

Figure 4:
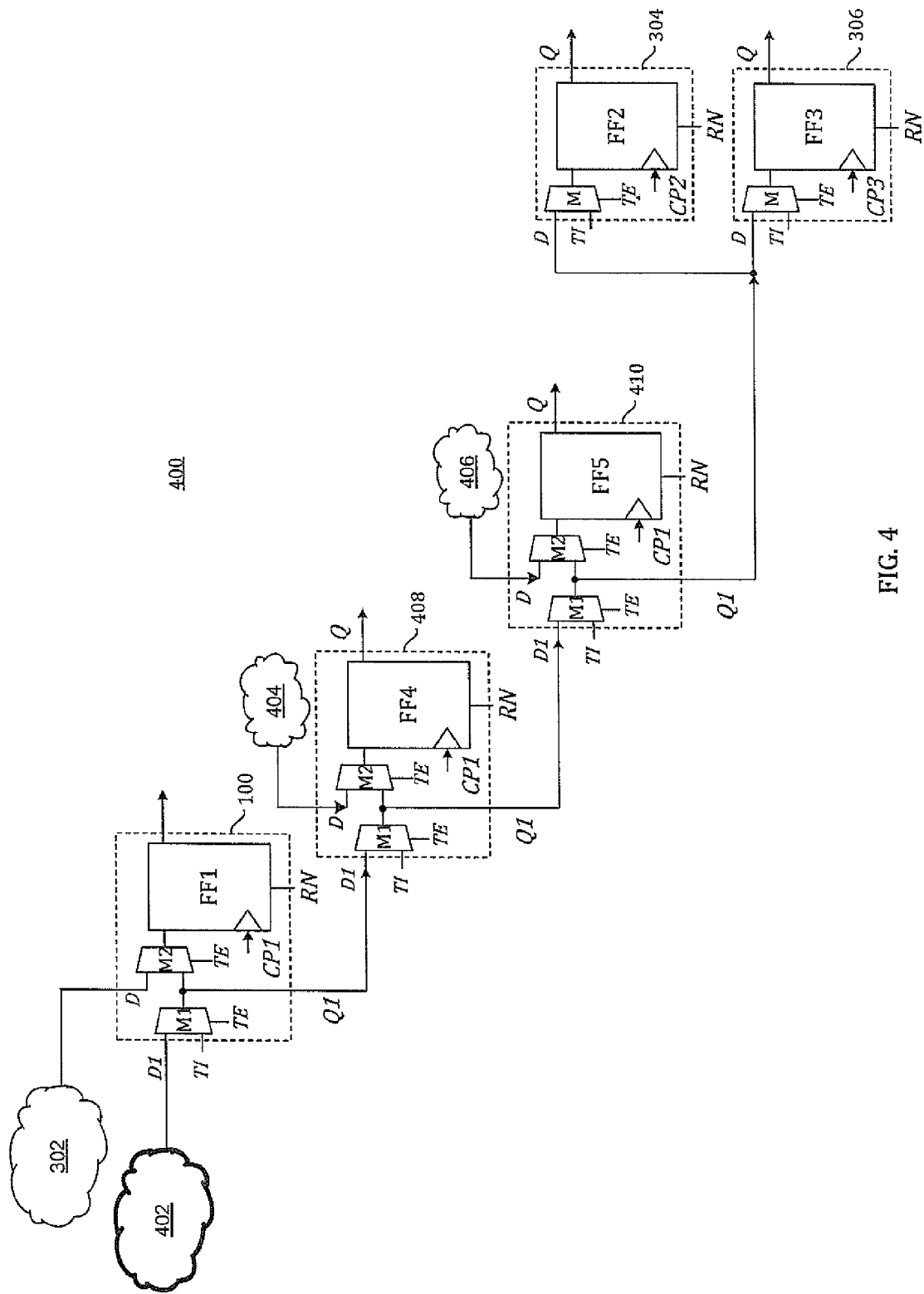

As illustrated in FIGS. 3 and 4, the first data input node D1 may be connected with the combination of cells 202 to receive functional data input signals D1 in the functional mode of operation. At least a second one of the flip-flop cells 304, 306 has a functional data input node D connected to the first output node Q1 to receive functional data signals Q1 whose propagation is delayed, and for which the hold margin of the second flip-flop cell 304, 306 is increased, by transit through the first multiplexer M1. This configuration enables resolution of a hold time violation in the scan data signal TI of a first problematic flip-flop cell by replacing it by the signal delay cell 100, and also resolution of a hold time violation in the functional data signal D1 of a second problematic flip-flop cell(s) by interposing the first multiplexer M1 of the signal delay cell 100 in its functional data input node D.

As illustrated in FIG. 4, the signal delay cell 100 may precede at least a further one of the flip-flop cells that provides a further signal delay cell(s) 408, 410 that also has a first multiplexer M1 having a first data input node D1, a scan data input node TI and a first output node Q1, a second multiplexer M2 having a second data input node D, a second input node connected to the first output node, and a second output node Q1, and a flip-flop module FF4, FF5 having a data input connected to the second output node, a clock input node CP1 and a flip-flop output node Q. The first data input node D1 of the further signal delay cell(s) 408, 410 is connected to receive functional data input signals D1 in the functional mode of operation through the first multiplexer M1 of the preceding signal delay cell 100. At least the second one of the flip-flop cells 304, 306 has a functional data input node D connected to the first output node Q1 of the further signal delay cell 404, 406 to receive functional data signals Q1 whose propagation is delayed, and for which the hold margin of the second flip-flop cell is increased, by transit through the first multiplexers M1 of both the preceding and the further signal delay cell 100 and 408, 410. This configuration enables resolution of a hold time violation in the scan data signal TI of first problematic flip-flop cells by replacing them by the signal delay cells 100, 408, 410 and also resolution of a big hold time violation in the functional data signal D1 of second problematic flip-flop cells (without hold time violation in their scan data signals TI) by replacing them by the signal delay cells 304, 306.

In another configuration (not shown but derived from FIG. 3 or 4) at least one further of the flip-flop cells 304, 306 has a scan data input node TI connected to the first output node Q1 to receive scan data signals TI whose propagation is delayed, and for which the hold margin of the further flip-flop cell 304, 306 is increased, by transit through the first multiplexer M1 of the signal delay cell 100.

Figure 5:
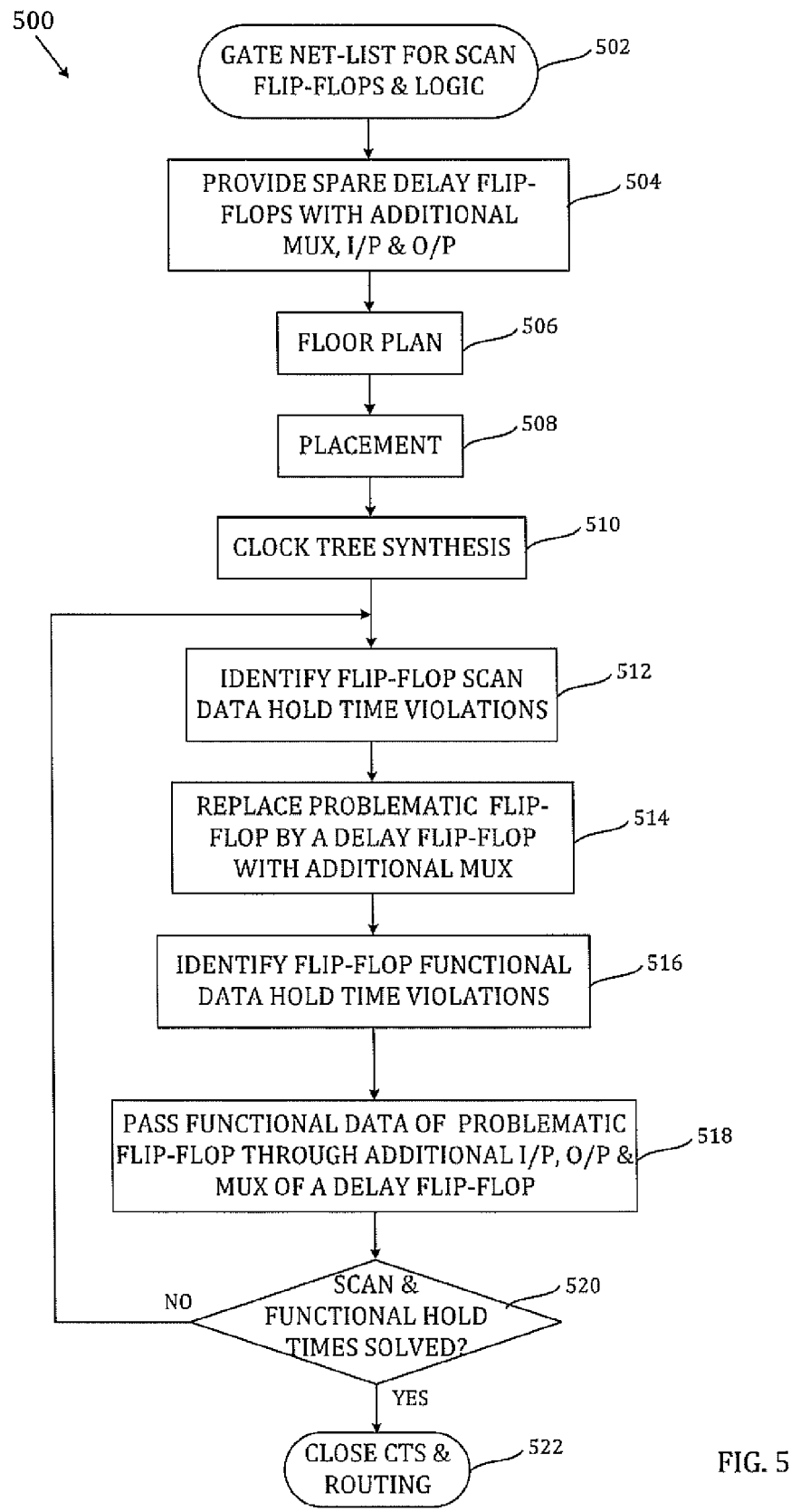
FIG. 5 is a flow chart of a method of adjusting hold timing in an integrated circuit (IC) design in accordance with an embodiment of the invention.
Figure 7:
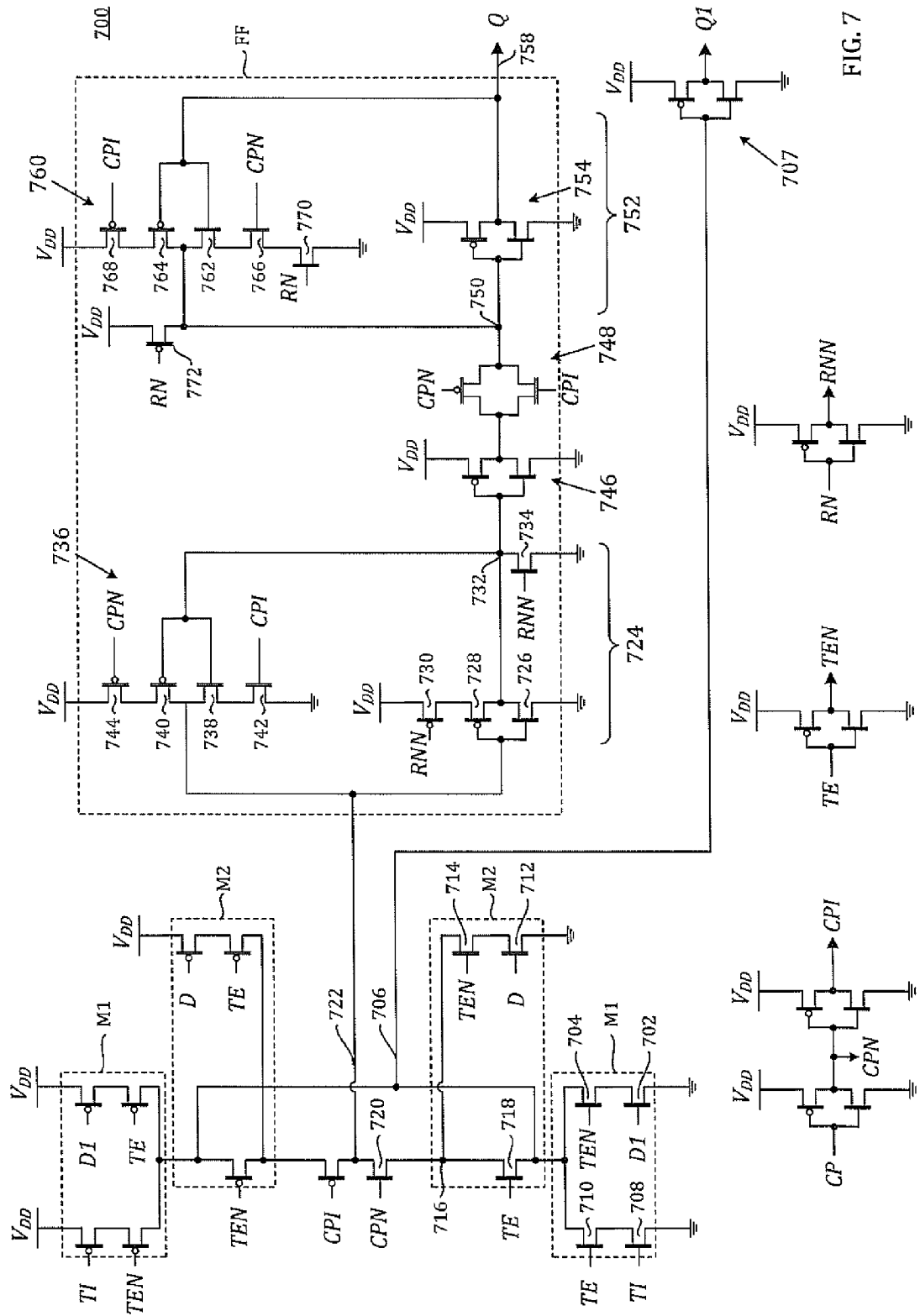
FIG. 7 is a schematic circuit diagram of a signal delay cell of FIG. 1.

FIG. 5 illustrates a method 500 in accordance with an embodiment of the invention of adjusting hold timing in design of IC such as 200, 300 and 400, including logic cells 202, 302 and 402 to 406 and flip-flop cells 100, 304, 306 and 408, 410 using an electronic design automation (EDA) tool such as 700 (FIG. 7). The method 500 may comprise at 502 providing a gate net-list for the flip-flop cells 100, 304, 306 and 408, 410 and logic cells 202, 302 and 402 to 406. Spare signal delay cells 100, 408, 410, each with an additional multiplexer M1, input node D1 and output node Q1 may be provided in the net-list at 504. A floor plan may be derived at 506 and placement performed at 508. The clock tree synthesis (CTS) may be performed at 510.

At 512, liability to scan test data hold violation is identified in at least a problematic one of the flip-flop cells. The problematic flip-flop cell is replaced by a signal delay cell 100, 408, 410 at 514, as described above.

Liability to functional data hold violation may be identified in at least a second problematic one of the flip-flop cells 304, 306 at 516. The functional data input node of the second problematic flip-flop cell is connected at 518 to receive functional data signals whose propagation is delayed by transit through the first multiplexer M1 of the signal delay cell 100, 408, 410. At 520, resolution of the functional data hold violation may be checked and, if not resolved, the method can revert to step 512. the steps 512 to 520 iterated in case clock glitches introduced during CTS cause further hold time violations. At 522 the design method may proceed to CTS closure, routing and subsequent steps.

Figure 6:
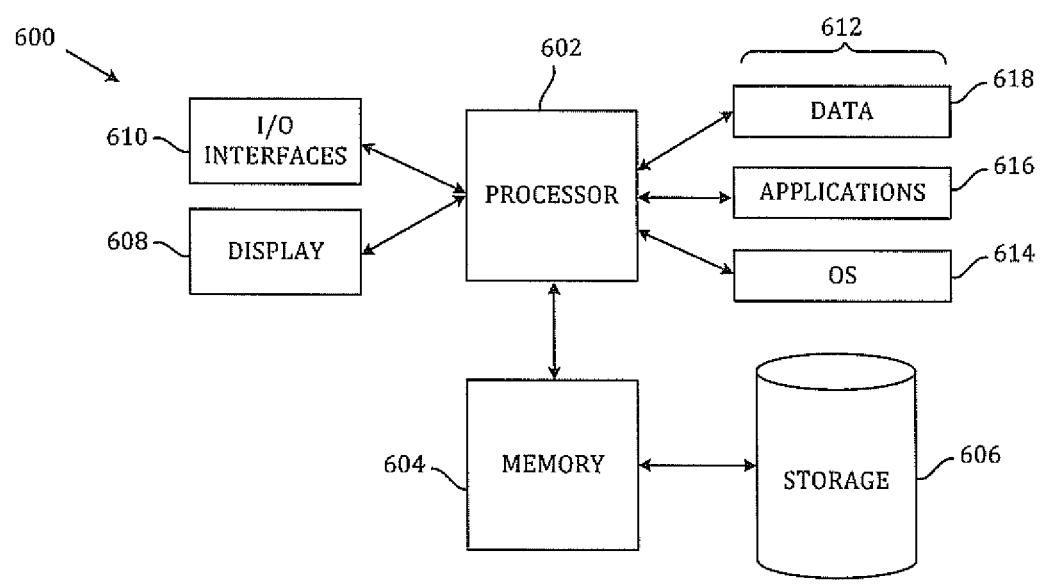
FIG. 6 is a schematic block diagram of an EDA tool in accordance with an embodiment of the present invention for performing the method of FIG. 5.

The method 500 is performed using an electronic design automation (EDA) tool such as 600 (FIG. 6), wherein the EDA tool 600 includes a processor 602 and a memory 604, 606 coupled to the processor 602, and wherein the integrated circuit design is stored in the memory 604, 606. Instructions corresponding to the steps of the method 600 may be stored in a non-transitory computer-readable storage medium and, when executed by an EDA tool, such as the EDA tool 600, can cause the EDA tool to perform the method 600.

The EDA tool 600 also includes a display device 608, input/output interfaces 610, and software 612. The software 612 includes operating system software 614, applications programs 616, and data 618. The EDA tool 600 generally is known in the art except for the software used to implement the method described above regarding estimating maximum capacitive cell load in an integrated circuit design. When software or a program is executing on the processor 602, the processor becomes a "means-for" performing the steps or instructions of the software or application code running on the processor 602. That is, for different instructions and different data associated with the instructions, the internal circuitry of the processor 602 takes on different states due to different register values, and so on, as is known by those of skill in the art. Thus, any means-for structures described herein relate to the processor 602 as it performs the steps of the methods disclosed herein.

FIG. 7 shows in more detail an example of a circuit 700 implementing the signal delay cell 100 (or 408, 410), using complementary metal-oxide-semiconductor (CMOS) technology. The first multiplexer M1 has n-type CMOS transistors 702 and 704 whose current conduction paths are connected in series between ground and an output node 706 of the first multiplexer M1. The output node 706 of the first multiplexer M1 is connected to the output node Q1 of the signal delay cell 100 (or 408, 410) through an inverter 707, formed by a complementary pair of CMOS transistors whose current conduction paths are connected in series between the voltage supply $V_{DD}$ and ground. The gate of the transistor 702 is connected to the input node D1 and the gate of the transistor 704 is connected to receive an inverted scan test enable signal TEN. N-type CMOS transistors 708 and 710 have current conduction paths connected in series between the node 706 and ground, in a branch parallel with the current conduction paths of the transistors 702 and 704. The gate of the transistor 708 is connected to the input node TI and the gate of the transistor 704 is connected to receive the non-inverted scan test enable signal TE. Complementary p-type transistors are connected in a similar configuration between the voltage supply $V_{DD}$ and the output node 706 of the first multiplexer M1, the branch connected to the input node D1 being gated by the non-inverted scan test enable signal TE and the branch connected to the input node TI being gated by the inverted scan test enable signal TEN.

The second multiplexer M2 has n-type CMOS transistors 712 and 714 whose current conduction paths are connected in series between ground and an output node 716 of the second multiplexer M2. The gate of the transistor 712 is connected to the input node D and the gate of the transistor 714 is connected to receive the inverted scan test enable signal TEN. An n-type CMOS transistor 718 is connected between the nodes 706 and 716. The gate of the transistor 718 is connected to receive the non-inverted scan test enable signal TE. The current conduction path of an n-type CMOS transistor 720 connects the output node 716 of the second multiplexer M2 to a node 722, the gate of the transistor 720 receiving a clock signal CPN that is inverted relative to the clock signal CP.

Complementary p-type transistors are connected in a similar configuration between the voltage supply $V_{DD}$ and the node 722, clocked by a doubly inverted clock signal CPI, the transistor connected to the input node D being gated by the non-inverted scan test enable signal TE.

The flip-flops FF, FF4 and FF5 of the signal delay cell 100 (or 408, 410) may be any suitable design. In the case of the signal delay circuit 700, the clock inputs of the flip-flop FF are provided by the n-type transistor 720 and the corresponding p-type transistor. The input node 722 of the flip-flop is connected to a master latch 724. The master latch includes a feed-forward inverter formed by a complementary pair of CMOS transistors 726 and 728 whose gates are connected to the flip-flop input node 722 and having current conduction paths connected in series with a reset CMOS transistor 730 between the voltage supply $V_{DD}$ and ground. The gate of the reset transistor 730 receives a doubly inverted reset signal RNN. An output node 732 of the inverter, at the connection between the current conduction paths of the transistors 726 and 728, is connected to ground through the current conduction path of another reset CMOS transistor 734 whose gate receives the doubly inverted reset signal RNN.

The output node 732 of the feed-forward inverter is connected to a clocked tri-state feedback inverter 736. The feedback inverter 736 includes a complementary pair of CMOS transistors 738 and 740 whose gates are connected to the node 732 and a complementary pair of CMOS transistors 742 and 744 whose gates receive the clock signals CPI and CPN. The current conduction paths of the transistors 742 and 744 connect the current conduction paths of the transistors 738 and 740 to ground and the voltage supply $V_{DD}$, respectively. The connection between the current conduction paths of the transistors 738 and 740 is connected to the input node 722 of the flip-flop.

The output node 732 of the master latch 724 is connected to an inverter 746 formed by a complementary pair of CMOS transistors whose current conduction paths are connected in series between the voltage supply $V_{DD}$ and ground. The output of the inverter 746 is connected to a clocked gate module 748 formed by a complementary pair of CMOS transistors whose current conduction paths are connected in parallel between the output of the inverter 746 and an output node 750 of the gate module 748. The gates of the transistors of the gate 750 are connected to receive the clock signals CPI and CPN so as to pass the output signal of the inverter 746 when the clock signal CPI is asserted.

The output node 750 of the gate module 748 is connected to the input of a slave latch 752. The slave latch 752 includes a feed-forward inverter formed by a complementary pair of CMOS transistors 754 and 756 whose gates are connected to the input node 750 and having current conduction paths connected in series between the voltage supply $V_{DD}$ and ground. An output node 758 of the inverter, at the connection between the current conduction paths of the transistors 754 and 756, forms the output node Q of the flip-flops FF, FF4 and FF5.

The output node 758 of the feed-forward inverter is connected to a clocked tri-state feedback inverter 760. The feedback inverter 760 includes a complementary pair of CMOS transistors 762 and 764 whose gates are connected to the node 758 and a complementary pair of CMOS transistors 766 and 768 whose gates receive the clock signals CPN and CPI. The current conduction path of the transistor 766 connects the current conduction path of the transistor 762 to ground through an n-type reset CMOS transistor 770, whose gate receives an inverted reset signal RN. The current conduction path of the transistor 768 connects the current conduction path of the transistor 764 to the voltage supply $V_{DD}$. The connection between the current conduction paths of the transistors 762 and 764 is connected to the input node 750 of the slave latch 752. A reset p-type CMOS transistor 772 whose gate receives the inverted reset signal RN connects the node 750 to the voltage supply $V_{DD}$.

The multiplexer M of the flip-flop cells 304 and 306 may have a similar structure to the multiplexer M2, except that the n-type transistors 702, 704 and 710 and the corresponding p-type transistors of the multiplexer M1, the inverter 707 and the output node Q1 are omitted, the current conduction path of the transistor 708 being connected directly between ground and the node 706. The flip-flops FF2 and FF3 of the flip-flop cells 304 and 306 may have a similar structure to the flip-flop FF.

Figure 8:
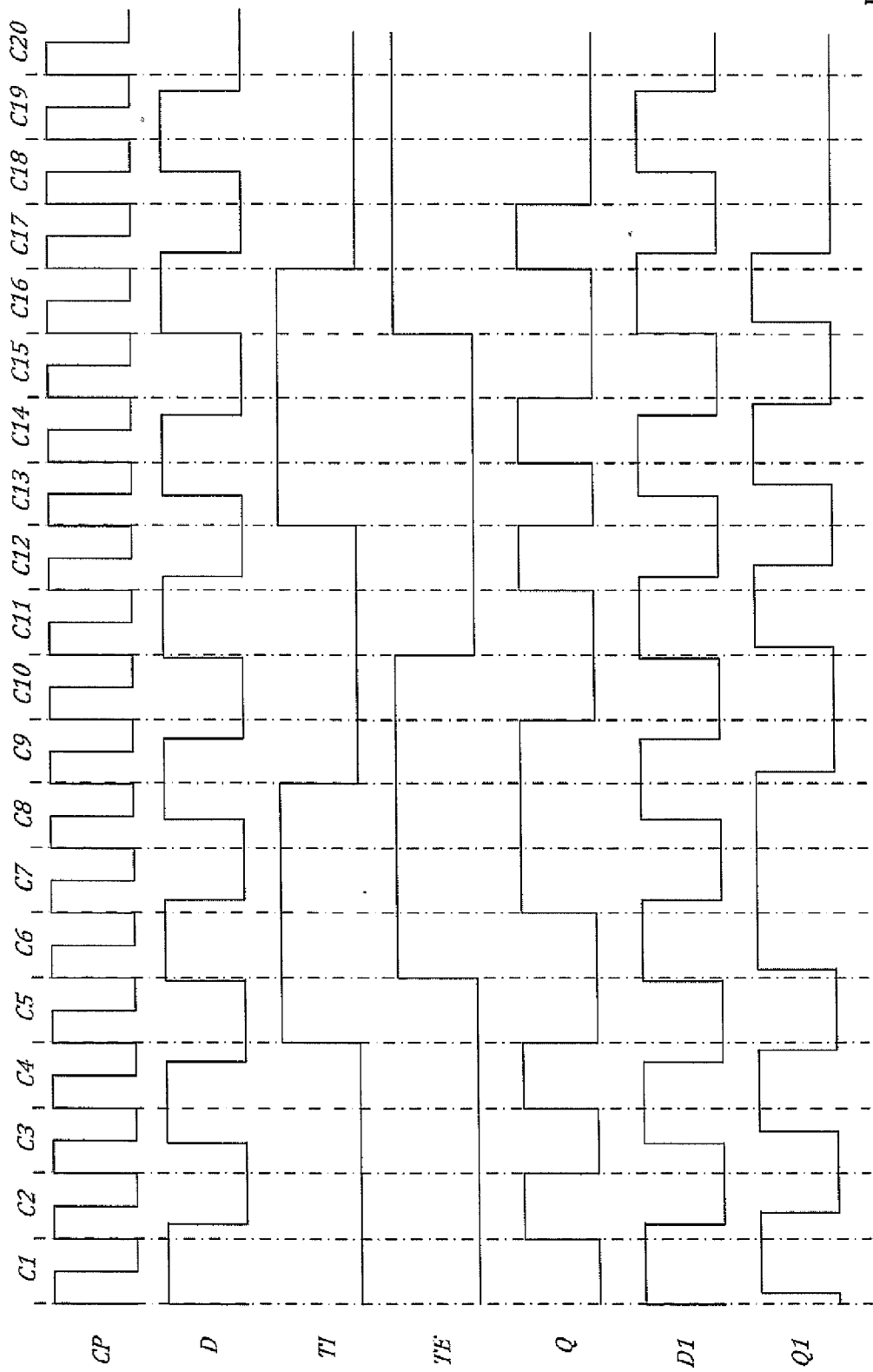
FIG. 8 is a graph of signals appearing in operation of the signal delay cell of FIG. 7

FIG. 8 shows an example of signals appearing in operation of the circuit 700. When the clock signal CP is de-asserted (low), the master latch 724 captures the output signal at the output node 722 of the multiplexer M2. The gate module 748 blocks the output signal of the master latch at the node 732 during this capture phase. During the following half clock cycle, when the clock signal CP is asserted, the n-type transistor 720 and corresponding p-type transistor isolate the node 722 from the signal inputs of the multiplexers M1 and M2. The transistors 742 and 744 of the feedback inverter 736 conduct and the transistors 738 and 740 invert the output signal of the master latch 724 at the node 732 and apply it to the input of the master latch. The output signal of the master latch 724 at the node 732 is latched. The gate module 748 transmits the output signal of the master latch at the node 732 to the slave latch 752 during this latch phase.

When the clock signal CP is asserted (high), the slave latch 752 captures the output signal at the output node 750 of the master latch 732, after inversion twice in the inverters 746 and 754 and transmits it as the output signal Q to the output node 758 of the flip-flop FF. During the following half clock cycle, when the clock signal CP is de-asserted, the transistors 766 and 768 of the feedback inverter 760 conduct and the transistors 762 and 764 invert the output signal Q at the output node 758 of the flip-flop FF and apply it to the input of the slave latch 752. The output signal Q of the slave latch 724 at the output node 758 of the flip-flop FF is latched.

FIG. 8 illustrates this operation for different combinations of the clock signal CP, functional data input signal D to the second multiplexer M2, scan test data input signal TI, scan test enable signal TE, flip-flop output signal Q, functional data input signal D1 to the first multiplexer M1, shown as identical to the input signal D to the second multiplexer M2, and output signal Q1 from the inverter 707. The operation is described below with reference to the n-type transistors, it being understood that the operation for the p-type transistors is complementary but comparable.

Initially, in the first clock cycle C1, the functional data input signal D and the functional data input signal D1 to the first multiplexer M1 are asserted. The scan test enable signal TE is de-asserted, the transistors 704 and 714 conduct, and the transistors 710 and 718 are cut off, so that the signal at the node 716 is inverted relative to the functional data input signal D. The output node 706 of the first multiplexer M1 follows the doubly inverted changes of the functional data input signal D1 to the first multiplexer M1, with a delay introduced by transit through the first multiplexer M1 and the inverter 707, whose transistors can be of reduced width, to increase the delay.

During the second half of the first clock cycle C1, the master latch 724 captures the signal at the node 716. At the leading edge of the clock signal CP in the second clock cycle C2, the slave latch 752 captures the output signal of the master latch 724 at the node 750 and transmits it to the output node 758 of the flip-flop FF. The feedback inverter 760 of the slave latch 752 latches the output signal Q at the output node 758 of the flip-flop FF during the second half of the second clock cycle C2.

During the first half of the second clock cycle C2, the functional data input signal D de-asserts. During the second half of the second clock cycle C2, the master latch 724 captures the asserted signal at the node 716, which appears inverted at the output node 758 of the flip-flop FF at the leading edge of the clock signal CP in the third clock cycle C3.

During the third clock cycle C3, the functional data input signal D asserts. The master latch 724 captures the de-asserted signal at the node 716, which appears inverted at the output node 758 of the flip-flop FF at the leading edge of the clock signal CP in the fourth clock cycle C4.

At the leading edge of the clock signal CP in the fifth clock cycle C5, the scan test data input signal TI asserts. However, the scan test enable signal TE is still de-asserted and the flip-flop FF continues to follow the changes of the functional data input signal D.

At the leading edge of the clock signal CP in the sixth clock cycle C6, the scan test enable signal TE asserts. The transistors 704 and 714 are cut off, and the transistors 710 and 718 conduct, so that the signal at the node 716 is inverted relative to the scan test data input signal TI, with the delay introduced by transit through the first multiplexer M1. The flip-flop FF follows the changes of the scan test data input signal TI at the clock edges.

During the following clock cycles C6, C7 and C8, the scan test data input signal TI remains asserted and the output signal Q at the output node 758 of the flip-flop FF remains asserted during the clock cycles C7, C8 and C9.

At the leading edge of the clock cycle C9, the scan test data input signal TI de-asserts. During the first half of the clock cycle C9, the transistors 710 and 718 are cut off, and the output Q of the flip-flop FF does not change. During the second half of the second clock cycle C9, the master latch 724 captures the asserted signal at the node 716, which appears inverted at the output node 758 of the flip-flop FF at the leading edge of the clock signal CP in the clock cycle C10.

While the flip-flop FF is following the changes of the functional data input signal D through the multiplexer M2, the multiplexer M1 does not delay the functional data input signal D and does not deteriorate its set-up time. However, the output of the multiplexer M1 at the node 706 reflects, inverted, the changes of the functional data input signal D1 to the first multiplexer M1 with the delay introduced by the multiplexer M1 when the scan test enable signal TE is de-asserted. If action on the hold time of the functional data input signal D1 is not needed, only functional data input signals D to the second multiplexers M2 can be used. The multiplexer M1 is available, if needed, to resolve hold time violations of scan test data input signals TI, which are more frequent, whether of the same or a different cell.

If action on the hold time of the functional data input signal is needed, it can be input to the first multiplexer M1 as signal D1, the delay of the multiplexer M1 and the inverter 707 helping resolution of the hold time violation. Any penalty incurred in set-up time can often be solved by other means.

The invention may be implemented at least partially in a non-transitory machine-readable medium containing a computer program for running on a computer system, the program at least including code portions for performing steps of a method according to the invention when run on a programmable apparatus, such as a computer system.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on non-transitory computer-readable media permanently, removably or remotely coupled to an information processing system. The computer-readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM and so on; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the above described operations are merely illustrative. Multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit (IC) comprising:
    logic cells;

flip-flop cells connected with the logic cells in a combination in a functional mode of operation, and connected together in series in a scan test mode of operation by a scan control signal for shifting scan test data into the IC; and a signal delay cell provided by at least one of the flip-flop cells, wherein the signal delay cell has a first multiplexer having a first data input node, a scan data input node and a first output node, a second multiplexer having a second data input node, a second input node connected to the first output node, and a second output node, and a flip-flop module having a data input connected to the second output node, a clock input node and a flip-flop output node, and wherein the propagation of a scan data input signal applied to the scan data input node in the scan test mode of operation is delayed, and the hold margin of the flip-flop module for the scan data input signal is increased by transit through the first multiplexer, and wherein the first data input node is connected with the combination of cells to receive functional data input signals in the functional mode of operation, and at least a second one of the flip-flop cells has a functional data input node connected to the first output node to receive functional data signals whose propagation is delayed, wherein the hold margin of the second flip-flop cell is increased by transit through the first multiplexer.

2. The IC of claim 1, wherein:
the signal delay cell precedes at least a further one of the flip-flop cells that provides a further signal delay cell that also has a first multiplexer having a first data input node, a scan data input node and a first output node, a second multiplexer having a second data input node, a second input node connected to the first output node, and a second output node, and a flip-flop module having a data input connected to the second output node, a clock input node and a flip-flop output node, the first data input node of the further signal delay cell is connected to receive functional data input signals in the functional mode of operation through the first multiplexer of the preceding signal delay cell, and at least the second one of the flip-flop cells has a functional data input node connected to the first output node of the further signal delay cell to receive functional data signals whose propagation is delayed, wherein the hold margin of the second flip-flop cell is increased by transit through the first multiplexers of both the preceding and the further signal delay cell.

3. The IC of claim 1, wherein the first data input node is connected with the combination of cells to receive functional data input signals in the functional mode of operation, and the signal delay cell has the second data input node connected to the first output node to receive functional data signals whose propagation is delayed, wherein the hold margin of the signal delay cell is increased by transit through the first multiplexer.

4. The IC of claim 1, wherein at least one further of the flip-flop cells has a scan data input node connected to the first output node to receive scan data signals whose propagation is delayed, wherein the hold margin of the further flip-flop cell is increased by transit through the first multiplexer.

5. A method of adjusting hold timing in design of an integrated circuit (IC) including logic cells and flip-flop cells using an electronic design automation (EDA) tool, wherein the flip-flop cells are connected with the logic cells in a combination in a functional mode of operation, and are connected together in series in a scan test mode of operation by a scan control signal for shifting scan test data into the IC, the method comprising:

identifying liability to scan test data hold violation in at least a problematic one of the flip-flop cells;

replacing the problematic flip-flop cell by a signal delay cell that has a first multiplexer having a first data input node, a scan data input node and a first output node, a second multiplexer having a second data input node, a second input node connected to the first output node, and a second output node, and a flip-flop module having a data input connected to the second output node, a clock input node and a flip-flop output node, wherein the propagation of a scan data input signal applied to the scan data input node in the scan test mode of operation is delayed, and the hold margin of the flip-flop module for the scan data input signal is increased by transit through the first multiplexer;

identifying liability to a functional data hold violation in the problematic one of the flip-flop cells;

connecting the first data input node to the combination of cells to receive functional data input signals in the functional mode of operation; and connecting the second data input node of the signal delay cell to the first output node to receive functional data signals whose propagation is delayed, wherein the hold margin of the signal delay cell is increased by transit through the first multiplexer.

6. The method of claim 5, further comprising:
identifying liability to a functional data hold violation in at least a second problematic one of the flip-flop cells, connecting the first data input node with the combination of cells to receive functional data input signals in the functional mode of operation, and connecting a functional data input node of the second problematic flip-flop cell to the first output node to receive functional data signals whose propagation is delayed, wherein the hold margin of the second problematic flip-flop cell is increased, by transit through the first multiplexer.

7. The method of claim 6, further comprising:
connecting the signal delay cell to precede a further signal delay cell that also has a first multiplexer having a first data input node, a scan data input node and a first output node, a second multiplexer having a second data input node, a second input node connected to the first output node, and a second output node, and a flip-flop module having a data input connected to the second output node, a clock input node and a flip-flop output node, wherein the first data input node of the further signal delay cell is connected to receive functional data input signals in the functional mode of operation through the first multiplexer of the preceding signal delay cell, and at least the second problematic flip-flop cell has a functional data input node connected to the first output node of the further signal delay cell to receive functional data signals whose propagation is delayed, wherein the hold margin of the second flip-flop cell is increased by transit through the first multiplexers of both the preceding and the further signal delay cell.

8. The method of claim 5, further comprising:
identifying liability to a scan test data hold violation in at least a further problematic one of the flip-flop cells; and connecting a scan data input node of the further problematic flip-flop cell to the first output node to receive scan data signals whose propagation is delayed, wherein the hold margin of the further flip-flop cell is increased by transit through the first multiplexer.

9. A non-transitory computer-readable storage medium storing instructions for execution by an electronic design automation (EDA) tool including a processor and a memory coupled to the processor which, when executed by the EDA tool, cause the EDA tool to perform a method of adjusting hold timing in an integrated circuit (IC) design stored in the memory, the IC design including logic cells and flip-flop cells, wherein the flip-flop cells are connected with the logic cells in a combination in a functional mode of operation, and are connected together in series in a scan test mode of operation by a scan control signal for shifting scan test data into the IC, the method comprising:

identifying liability to a scan test data hold violation in at least a problematic one of the flip-flop cells;

replacing the problematic flip-flop cell by a signal delay cell that has a first multiplexer having a first data input node, a scan data input node and a first output node, a second multiplexer having a second data input node, a second input node connected to the first output node, and a second output node, and a flip-flop module having a data input connected to the second output node, a clock input node and a flip-flop output node, wherein the propagation of a scan data input signal applied to the scan data input node in the scan test mode of operation is delayed, and the hold margin of the flip-flop module for the scan data input signal is increased by transit through the first multiplexer;

identifying liability to a scan test data hold violation in at least a further problematic one of the flip-flop cells; and connecting a scan data input node of the further problematic flip-flop cell to the first output node to receive scan data signals whose propagation is delayed, wherein the hold margin of the further flip-flop cell is increased by transit through the first multiplexer.

10. The non-transitory computer-readable storage medium of claim 9, wherein the method further comprises:

identifying liability to a functional data hold violation in at least a second problematic one of the flip-flop cells;

connecting the first data input node to the combination of cells to receive functional data input signals in the functional mode of operation; and connecting a functional data input node of the second problematic flip-flop cell to the first output node to receive functional data signals whose propagation is delayed, wherein the hold margin of the second problematic flip-flop cell is increased by transit through the first multiplexer.

11. The non-transitory computer-readable storage medium of claim 10, wherein the method further comprises:

connecting the signal delay cell to precede a further signal delay cell that also has a first multiplexer having a first data input node, a scan data input node and a first output node, a second multiplexer having a second data input node, a second input node connected to the first output node, and a second output node, and a flip-flop module having a data input connected to the second output node, a clock input node and a flip-flop output node, and connecting the first data input node of the further signal delay cell to receive functional data input signals in the functional mode of operation through the first multiplexer of the preceding signal delay cell, and wherein at least the second problematic flip-flop cell has a functional data input node connected to the first output node of the further signal delay cell to receive functional data signals whose propagation is delayed, wherein the hold margin of the second flip-flop cell is increased by transit through the first multiplexers of both the preceding and the further signal delay cell.

12. The non-transitory computer-readable storage medium of claim 9, wherein the method further comprises:

identifying liability to functional data hold violations in the problematic one of the flip-flop cells;

connecting the first data input node to the combination of cells to receive functional data input signals in the functional mode of operation; and connecting the second data input node of the signal delay cell to the first output node to receive functional data signals whose propagation is delayed, wherein the hold margin of the signal delay cell is increased by transit through the first multiplexer.

* * * * *